(12) United States Patent
Shen

(10) Patent No.: US 7,895,711 B2
(45) Date of Patent: Mar. 1, 2011

(54) HINGE AND COLLAPSIBLE DEVICE UTILIZING THE SAME

(75) Inventor: Wen-Bin Shen, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1 day.

(21) Appl. No.: 12/346,894

(22) Filed: Dec. 31, 2008

(65) Prior Publication Data

US 2010/0139040 A1 Jun. 10, 2010

(30) Foreign Application Priority Data

Dec. 10, 2008 (CN) .................... 2008 2 0303300 U

(51) Int. Cl.
E05C 17/64 (2006.01)
(52) U.S. Cl. ....................................... 16/342
(58) Field of Classification Search ................... 16/342, 16/252, 253, 337, 341
See application file for complete search history.

(56) References Cited

U.S. PATENT DOCUMENTS

| | | | | |
|---|---|---|---|---|
| 4,490,884 A | * | 1/1985 | Vickers | 16/338 |
| 5,682,645 A | * | 11/1997 | Watabe et al. | 16/338 |
| 6,286,185 B1 | * | 9/2001 | Ramsauer | 16/236 |
| 6,584,646 B2 | * | 7/2003 | Fujita | 16/342 |
| 7,114,218 B1 | * | 10/2006 | Lin | 16/342 |
| 7,472,459 B2 | * | 1/2009 | Lee et al. | 16/342 |
| 7,735,797 B2 | * | 6/2010 | Hu | 248/371 |
| 2001/0016969 A1 | * | 8/2001 | Fujita | 16/342 |
| 2001/0022011 A1 | * | 9/2001 | Vittorio | 16/334 |
| 2003/0172497 A1 | * | 9/2003 | Cha | 16/342 |
| 2003/0221288 A1 | * | 12/2003 | Kim et al. | 16/337 |
| 2007/0157433 A1 | * | 7/2007 | Lu et al. | 16/342 |
| 2008/0184527 A1 | * | 8/2008 | Chao | 16/221 |
| 2008/0184530 A1 | * | 8/2008 | Chao | 16/342 |

* cited by examiner

*Primary Examiner*—David J Bagnell
*Assistant Examiner*—Matthew Sullivan
(74) *Attorney, Agent, or Firm*—Zhigang Ma

(57) ABSTRACT

A hinge includes a first connecting member, a second connecting member, a sleeve, a shaft fixed to the first connecting member, a clamping member, and a fastening member. The sleeve is fixed to the second connecting member, and axially defines an opening. The shaft includes a fixing rod rotatably received in the sleeve, and the clamping member adjustably clamps the sleeve to adjustably clamp the fixing rod. The fastening member is configured for adjustably tightening the clamping member to allow squeezing or expansion of the sleeve to make the sleeve adjustably clamp the fixing rod.

12 Claims, 4 Drawing Sheets

HINGE AND COLLAPSIBLE DEVICE UTILIZING THE SAME

BACKGROUND

1. Technical Field

The present disclosure relates to hinges, and particularly to a hinge and a collapsible device using the hinge.

2. Description of Related Art

A collapsible device, such as a notebook computer or a clamshell mobile phone, generally includes a main body connected to a display by a hinge. One such hinge includes a female hinge member mounted to the display and a male hinge member mounted to the main body, thereby allowing the display to be rotational with respect to the main body, and to be folded to the main body to save space.

The male hinge member includes a split shaft sleeve, and the female hinge member includes a shaft rotatably received in the shaft sleeve. The shaft is in frictional engagement with the inside of the shaft sleeve during rotation. Therefore, the display can be maintained at any angle with respect to the main body by the friction between the shaft and the shaft sleeve. However, this kind of hinge is not durable because the shaft and the shaft sleeve are easily worn out. Even worse, after frequent usage and due to wear and tear, the shaft and the shaft sleeve may no longer fit together tightly, thereby preventing the display from being able to stay at certain desirable positions. As a result, the display cannot maintain stability at almost any angle with respect to the main body, which creates inconvenience for users.

DETAILED DESCRIPTION

Figure 1:
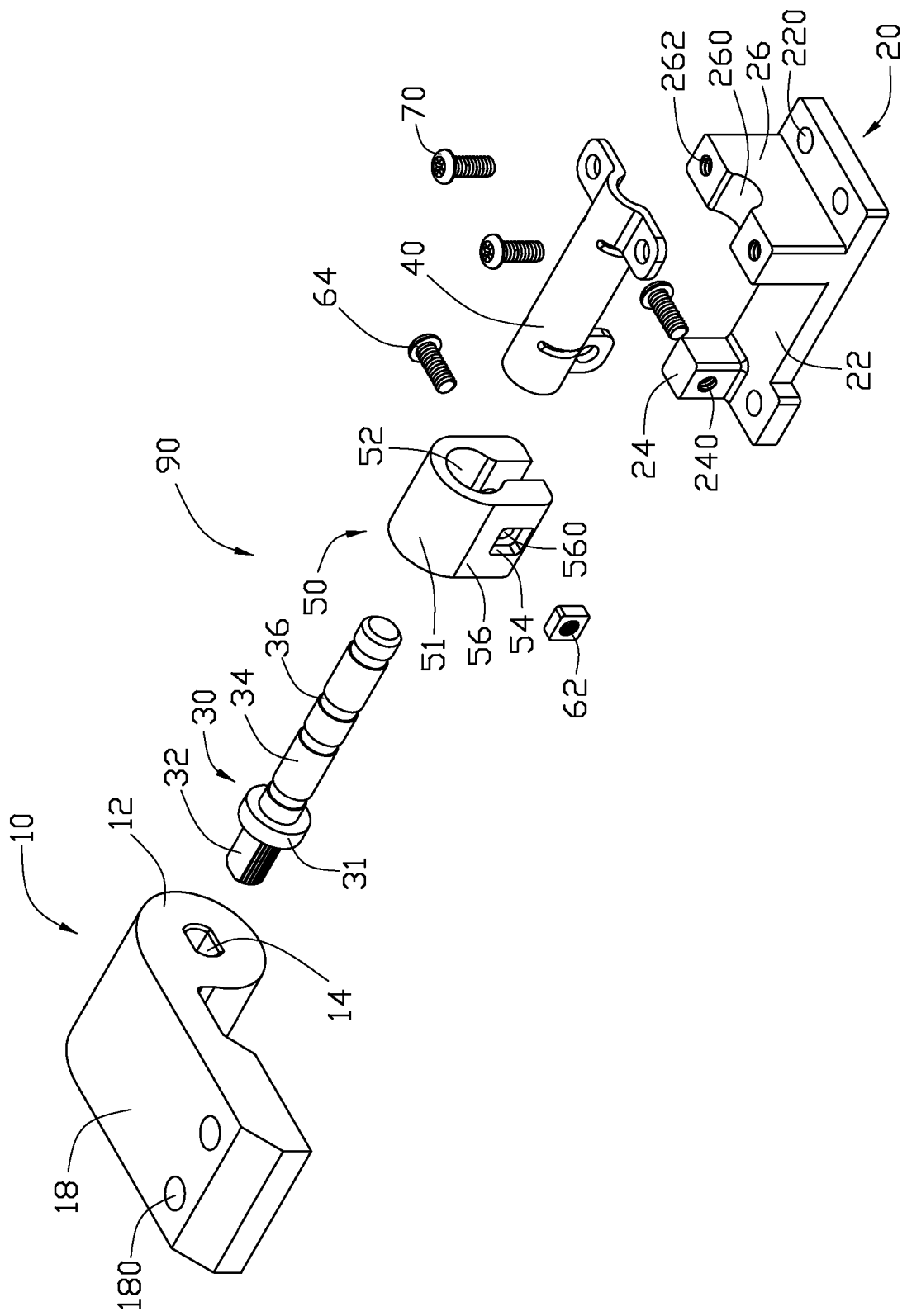
FIG. 1 is an exploded, isometric view of an exemplary embodiment of a hinge including a sleeve.

Referring to FIG. 1, an exemplary embodiment of a hinge 90 (labeled in FIG. 3) includes a first connecting member 10, a second connecting member 20, a shaft 30 mounted to the first and second connecting members 10 and 20, a sleeve 40 fixed to the second connecting member 20, a clamping member 50, a plurality of fasteners 70, and a fastening member 60 (labeled in FIG. 3) for firmly clamping the clamping member 50 to the shaft 30.

The first connecting member 10 includes a flat connecting portion 18 defining a plurality of fixing holes 180, and a cylindrical fixing portion 12 positioned at a side of the connecting portion 18. The fixing portion 12 axially defines a fixing hole 14 in an end surface of the fixing portion 12. The fixing hole 14 has a double-D shape in the instant embodiment.

The second connecting member 20 includes a flat securing portion 22 defining a plurality of fixing holes 220, a first protrusion 24 transversely defining a fixing hole 240, and a second protrusion 26 parallel to the first protrusion 24. The first and second protrusions 24 and 26 perpendicularly extend from the securing portion 22. The second protrusion 26 defines an arc-shaped trough 260 in the top surface thereof opposite to the securing portion 22. Two fixing holes 262 positioned at two opposite sides of the trough 260 are vertically defined in the top surface of the second protrusion 26.

The shaft 30 includes a fixing portion 32 having a double-D shaped cross-section in the instant embodiment, a cylindrical-shaped fixing rod 34 opposite to the fixing portion 32, and a flange 31 connected between the fixing portion 32 and the fixing rod 34. A plurality of circular troughs 36 capable of retaining lubricant are defined in a circumference of the fixing rod 34.

Figure 2:
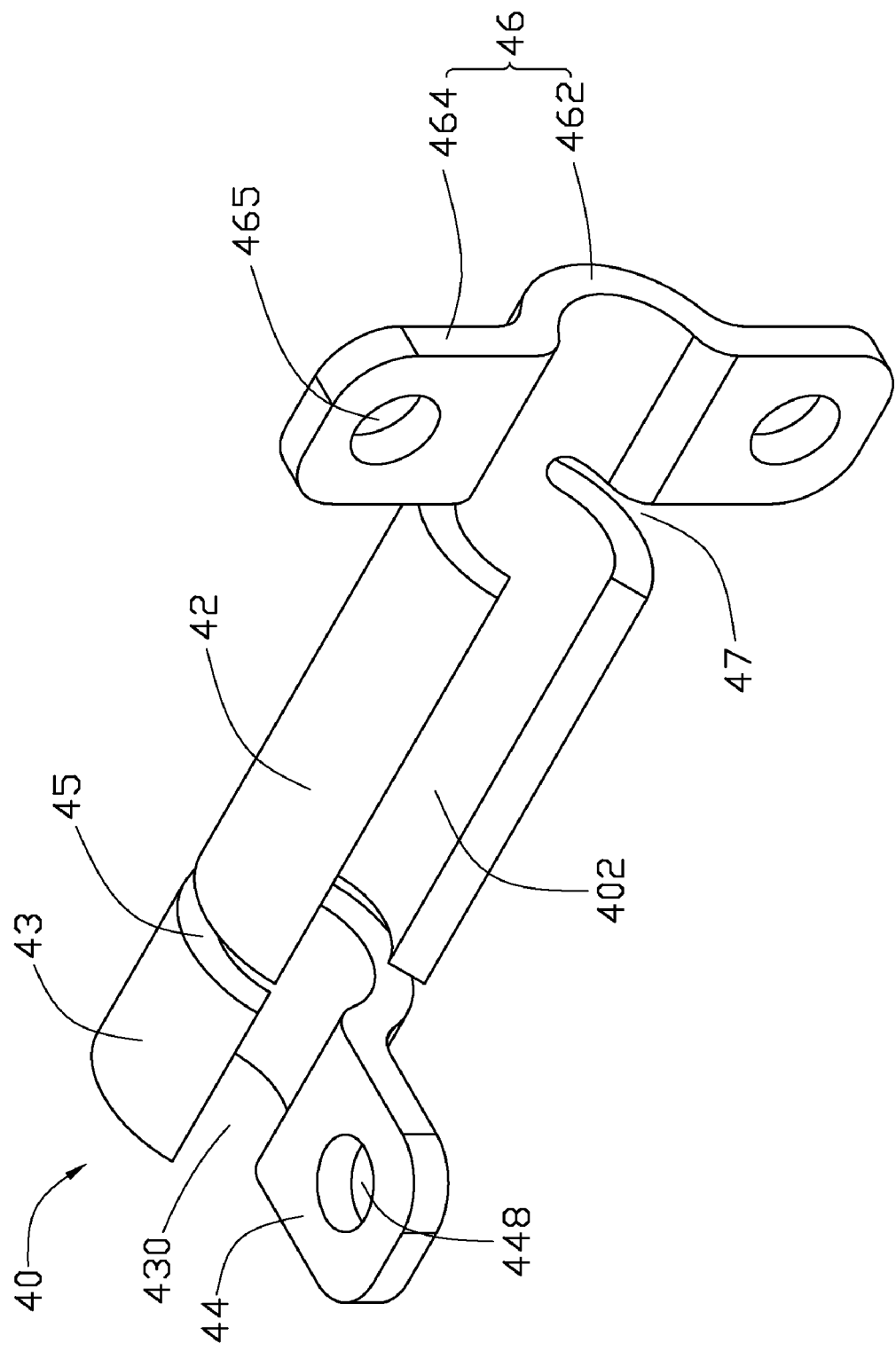
FIG. 2 is an enlarged, isometric view of the sleeve of FIG. 1, but viewed from another perspective.

Referring to FIG. 2, the sleeve 40 includes a main body 42 having a generally C-shaped cross-section, a first fixing portion 43, and a second fixing portion 46 opposite to the first fixing portion 43. An opening 402 is longitudinally defined, extending from a first end of the main body 42 to an opposite second end of the main body 42, to enable deformation of the sleeve 40. The first fixing portion 43 extends from the first end of the main body 42, a first gap 45 communicating with the opening 402 is bounded by the first fixing portion 43 and the first end of the main body 42. The first fixing portion 43 having a generally C-shaped cross-section is coaxial with the sleeve 40, therefore the first fixing portion 43 also has an opening 430 coaxial and communicating with the opening 402. A tab 44 defining a through hole 448 extends from a side of the first fixing portion 43. The second fixing portion 46 includes an arc-shaped position board 462 extending from the second end of the main body 42, and two fixing tabs 464 each defining a through hole 465 extending from two opposite sides of the position board 462. Therefore, a second gap 47 communicating with the opening 402 is bounded by the second fixing portion 46 and the second end of the main body 42.

Referring to FIG. 1 again, the clamping member 50 includes a clamping portion 51 having a generally C-shaped cross-section, and two clamping boards 56 extending from two opposite sides of the clamping portion 51. The clamping portion 51 axially defines a clamping hole 52. The clamping boards 56 define two aligning through holes 560, wherein one of the two clamping boards 56 defines a depressed portion 54 communicating with the corresponding through hole 560.

The fastening member 60 includes a screw 64 and a matching screw nut 62. In the instant embodiment, the screw nut 62 is square-shaped corresponding to the depressed portion 54.

Figure 3:
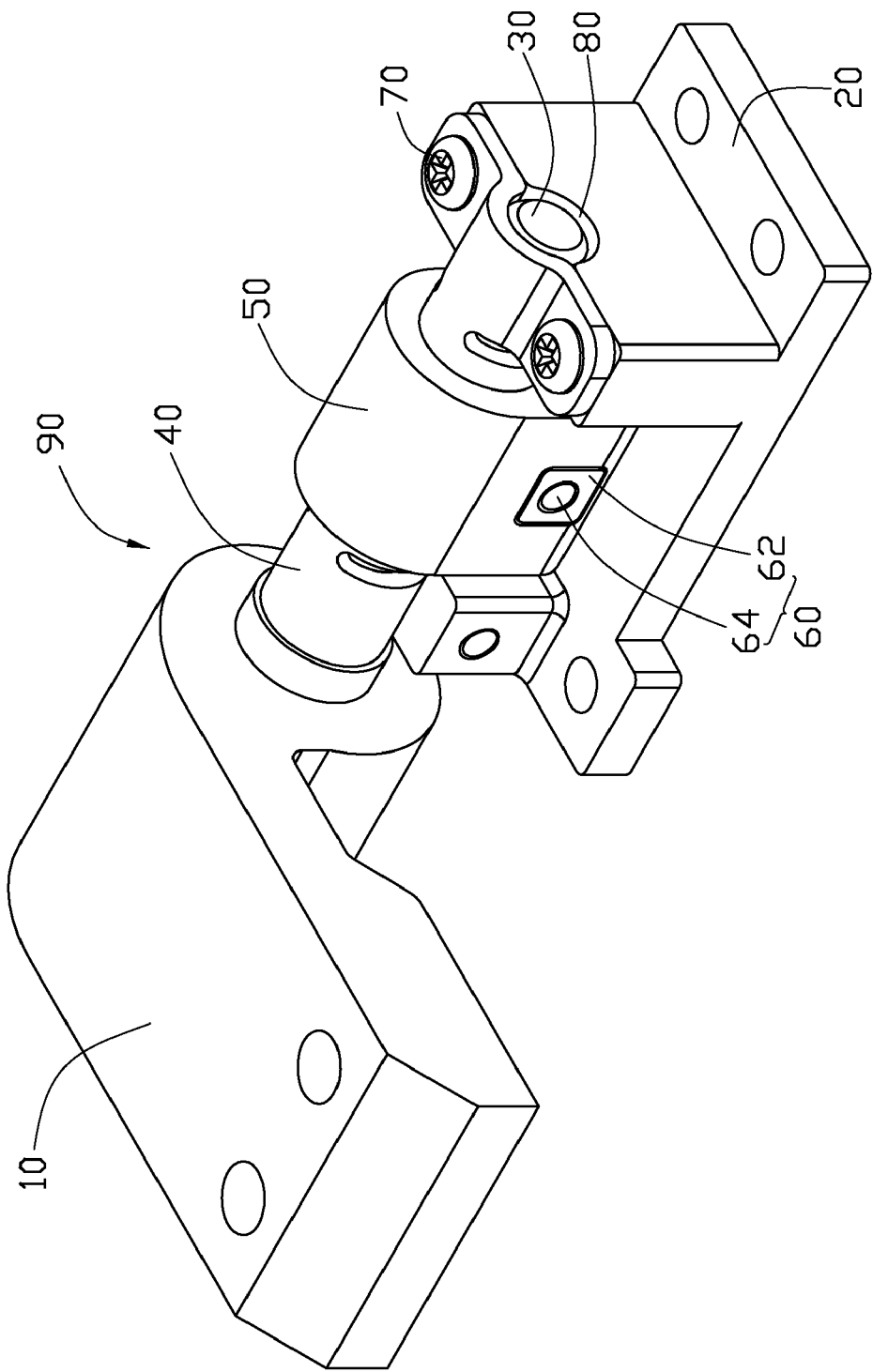
FIG. 3 is an assembled, isometric view of FIG. 1.

Referring to FIG. 3, in assembly, the fixing portion 32 of the shaft 30 is fixed in the fixing hole 14 of the first connecting member 10. Therefore, the shaft 30 is non-rotatably fixed to the first connecting member 10. The first end of the sleeve 40 is passed through the clamping hole 52 of the clamping member 50, therefore, the clamping member 50 is movably mounted to the sleeve 40. The fixing rod 34 is rotatably passed through the sleeve 40. The tab 44 resists against a sidewall of the first protrusion 24, with the fixing hole 240 aligning with the through hole 448. The fixing tabs 464 resist against the top surface of the second protrusion 24, with the fixing holes 262 aligning with the corresponding through holes 465. The fasteners 70 are passed through the corresponding through holes 448 and 465, and screwed into the corresponding fixing holes 240, 262. Therefore, the sleeve 40 is fixed to the second connecting member 20. The position board 462 and the trough 260 cooperatively form a receiving space 80 for rotatably receiving a free end of the fixing rod 34 of the shaft 30. The screw nut 62 is received in the depressed portion 54. The clamping member 50 is moved along the sleeve 40, and positioned between the first and second gaps 45 and 47. The screw 64 is adjustably passed through the through holes 560 of the clamping boards 56 in turn, and screwed into the screw nut 62. Therefore, the clamping member 50 is adjustable to make the sleeve 40 clamp the fixing rod 34.

Figure 4:
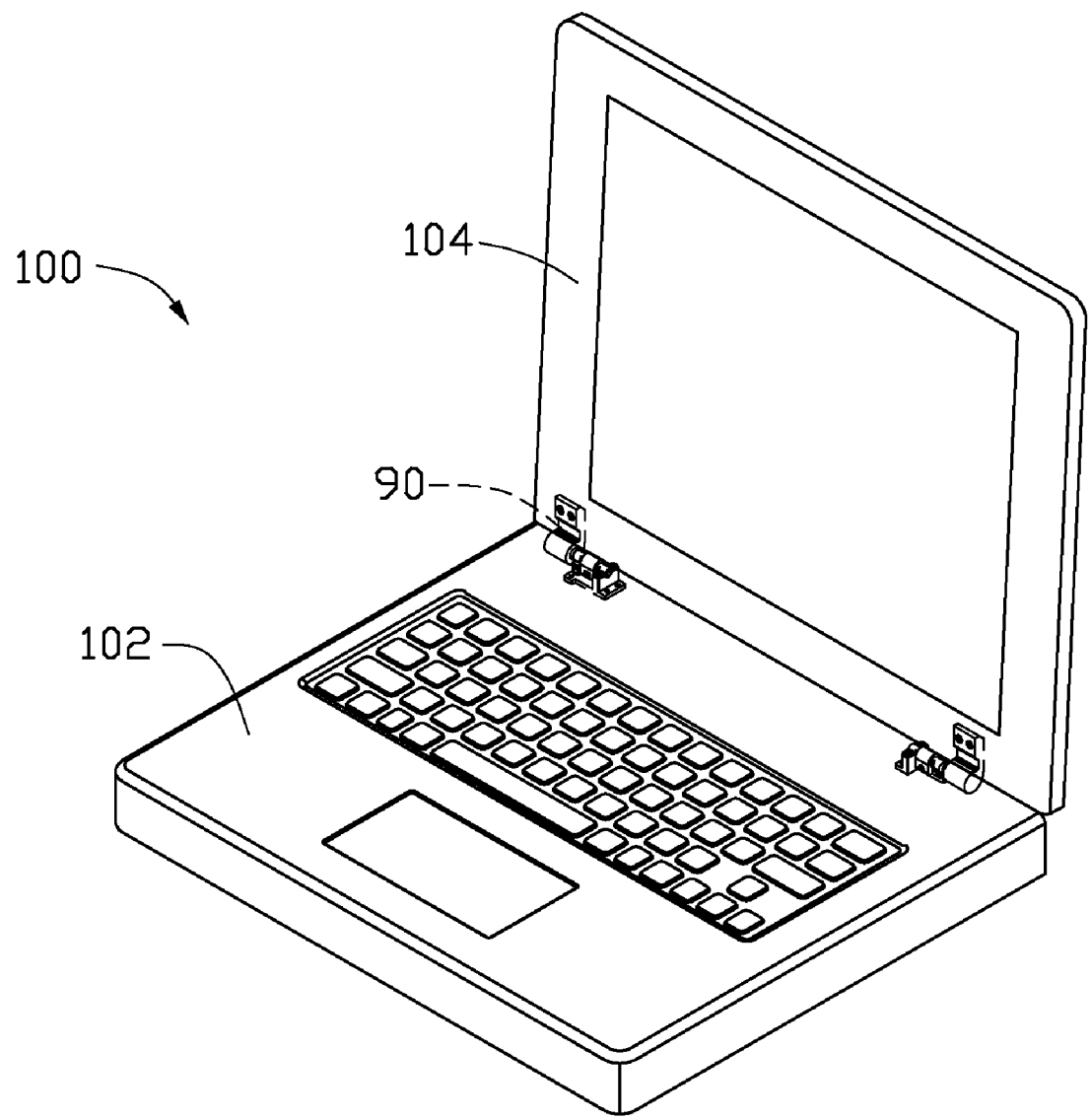
FIG. 4 is an isometric view of an exemplary embodiment of a collapsible device utilizing the hinge of FIG. 1.

Referring to FIG. 4, in use, the above-mentioned hinge 90 is utilized in a collapsible device 100, here for instance, in a notebook computer that includes a base 102 and a cover 104. The fixing holes 180 are configured for allowing fastening members, such as screws, bolts, or rivets, etc., to extend through to fix the first connecting member 10 to the cover 104. Similarly, the fixing holes 220 are configured for allowing fastening members, such as screws, bolts, or rivets, etc., to extend through to fix the second connecting member 20 to the base 102. Therefore, during rotation of the cover 104 relative to the base 102, the first connecting member 10 rotates relative to the second connecting member 20, with the fixing rod 34 rotatable relative to the sleeve 40 and the receiving space 80. As a result, friction between the fixing rod 34, the sleeve 40, and the receiving space 80 positions the cover 104 maintaining stability at any angle with respect to the base 102.

It is believed that the present embodiments and their advantages will be understood from the foregoing description, and it will be apparent that various changes may be made thereto without departing from the spirit and scope of the description or sacrificing all of its material advantages, the examples hereinbefore described merely being exemplary embodiments.

What is claimed is:

1. A hinge comprising:
   a first connecting member;
   a second connecting member;
   a sleeve having two opposite ends fixed to the second connecting member, the sleeve being a curve plate having two opposite side edges getting close but leaving a longitudinal opening extending through the opposite ends of the sleeve, a first gap and a second gap defined in the opposite side edges of the curve plate adjacent to the opposite ends of sleeve, respectively, the first and second gaps communicating with the opening, and a main body formed between the first and second gaps;
   a shaft fixed to the first connecting member, the shaft comprising a fixing rod rotatably received in the sleeve;
   a clamping member sleeved on the main body of the sleeve; and
   a fastening member configured for adjustably tightening the clamping member, wherein when the clamping member is adjustably tightened or loosened via the fastening member, the main body is squeezed or expanded to adjustably clamp the fixing rod without warping the opposite ends of the sleeve;
   wherein the fixing rod is rotatably passed through the sleeve; the clamping member comprises a clamping portion clamping the main body, and two clamping boards extending from two opposite sides of the clamping portion, the fastening member is adjustably mounted to the clamping boards; the sleeve further comprises a first fixing portion having a C-shaped cross-section and extending from a first end of the main body, and a second fixing portion extending from a second end of the main body; the first gap is bounded by the first fixing portion and the first end of the main body, the second gap is bounded by the second fixing portion and the second end of the main body; the second connecting member comprises a first protrusion, and a second protrusion parallel to the first protrusion, the first fixing portion is fixed to the first protrusion, the second fixing portion is fixed to the second protrusion; the second fixing portion comprises an arc-shaped position board extending from the second end of the main body, and two fixing tabs extending from two opposite sides of the position board, a top surface of the second protrusion defines an arc-shaped trough, the fixing tabs are fixed to the top surface of the second protrusion, the trough and the position board cooperate to form a receiving space for receiving a free end of the fixing rod.

2. The hinge of claim 1, wherein the two clamping boards each define a through hole, the fastening member comprises a screw and a matching screw nut engaged with the screw to lock the two clamping boards together.

3. The hinge of claim 2, wherein one of the clamping boards defines a depressed portion communicating with the corresponding through hole to receive the screw nut.

4. The hinge of claim 2, wherein the screw nut is square-shaped.

5. The hinge of claim 1, wherein the first fixing portion comprises a tab extending therefrom, the tab is fixed to a sidewall of the first protrusion by a fastener.

6. The hinge of claim 1, wherein the shaft further comprises a fixing portion opposite to the fixing rod, the first connecting member defines a fixing hole for fixing the fixing portion.

7. A collapsible device comprising:
   a base;
   a hinge comprising:
      a first connecting member comprising a connecting portion;
      a second connecting member comprising a securing portion;
      a sleeve having two opposite ends fixed to the second connecting member, the sleeve being a curve plate having two opposite side edges getting close but leaving a longitudinal opening extending through the opposite ends of the sleeve, a first gap and a second gap defined in the opposite side edges of the curve plate adjacent to the opposite ends of sleeve, respectively, the first and second gaps communicating with the opening, and a main body formed between the first and second gaps;
      a shaft fixed to the first connecting member, the shaft comprising a fixing rod rotatably received in the sleeve;
      a clamping member sleeved on the main body of the sleeve; and
      a fastening member configured for adjustably tightening the clamping member, wherein when the clamping member is adjustably tightened or loosened via the fastening member, the main body is squeezed or expanded to adjustably clamp the fixing rod without warping the opposite ends of the sleeve; and
   a cover pivotally mounted to the base via the hinge;
   wherein the connecting portion is fixed to the cover, and the securing portion is fixed to the base; the shaft is capable of rotating relative to the second connecting member, together with the first connecting member; the sleeve is capable of being squeezed to tightly clamp the shaft in response to the fastening member tightening the clamping member; the fixing rod is rotatably passed through the sleeve; the clamping member comprises a clamping portion clamping the main body, and two clamping boards extending from two opposite sides of the clamping portion, the fastening member is adjustably mounted to the clamping boards; the sleeve further comprises a first fixing portion having a C-shaped cross-section and extending from a first end of the main body, and a second fixing portion extending from a second end of the main body; the first gap is bounded by the first fixing portion and the first end of the main body, the second gap is bounded by the second fixing portion and the second end of the main body; the second connecting member comprises a first protrusion, and a second protrusion parallel to the first protrusion, the first fixing portion is fixed to the first protrusion, the second fixing portion is fixed to the second protrusion; the second fixing portion comprises an arc-shaped position board extending from the second end of the main body, and two fixing tabs extending from two sides of the position board, a top surface of the second protrusion defines an arc-shaped trough, the fixing tabs are fixed to the top surface of the second protrusion, the trough and the position board cooperate to form a receiving space for receiving a free end of the fixing rod.

8. The collapsible device of claim 7, wherein the two clamping boards each define a through hole, the fastening member comprises a screw and a matching screw nut engaged with the screw to lock the two clamping boards together.

9. The collapsible device of claim 8, wherein one of the clamping boards defines a depressed portion communicating with the corresponding through hole to receive the screw nut.

10. The collapsible device of claim 8, wherein the screw nut is square-shaped.

11. The collapsible device of claim 7, wherein the first fixing portion comprises a tab extending therefrom, the tab is fixed to a side of the first protrusion by a fastener.

12. The collapsible device of claim 7, wherein the shaft further comprises a fixing portion opposite to the fixing rod, the first connecting member defines a fixing hole for fixing the fixing portion.

* * * * *